United States Patent [19]
DiPietro

[11] Patent Number: 5,094,777
[45] Date of Patent: Mar. 10, 1992

[54] POLYAMIDE FLUORESCENT PIGMENTS
[75] Inventor: Thomas C. DiPietro, Barberton, Ohio
[73] Assignee: Day Glo Color Corporation, Cleveland, Ohio
[21] Appl. No.: 675,101
[22] Filed: Mar. 25, 1991

Related U.S. Application Data
[63] Continuation of Ser. No. 409,099, Sep. 19, 1989, abandoned.
[51] Int. Cl.$^5$ ............................................. C09K 11/02
[52] U.S. Cl. .............................. 252/301.35; 524/606; 524/845
[58] Field of Search ................... 252/301.35; 524/606, 524/845

[56] References Cited

U.S. PATENT DOCUMENTS
2,938,873  5/1960  Kazenas ........................ 252/301.35
3,181,949  5/1965  Koerber et al. ................ 252/301.35
3,412,036 11/1968  McIntosh ........................... 525/509
3,812,054  5/1974  Noetzel et al. ................. 252/301.35
3,915,884 10/1975  Kazenas .......................... 252/301.35
3,922,232 11/1975  Schein ................................ 528/291

FOREIGN PATENT DOCUMENTS
47-14702  5/1972  Japan .............................. 252/301.35

Primary Examiner—Prince Willis, Jr.
Assistant Examiner—Jerry D. Johnson
Attorney, Agent, or Firm—Pearne, Gordon, McCoy & Granger

[57] ABSTRACT

A fluorescent pigment includes a fluorescent dye and a resin carrier which is the polyamide reaction product of a diamine and a diacid. The fluorescent pigments are especially useful to color plastics and have improved resistance to plateout during molding. The pigments may be melt-blended with plastic to provide a color concentrate. The polyamide resins have a molecular weight in the range of 3,000 to 50,000 and may be readily ground to micron sized particles.

21 Claims, 1 Drawing Sheet

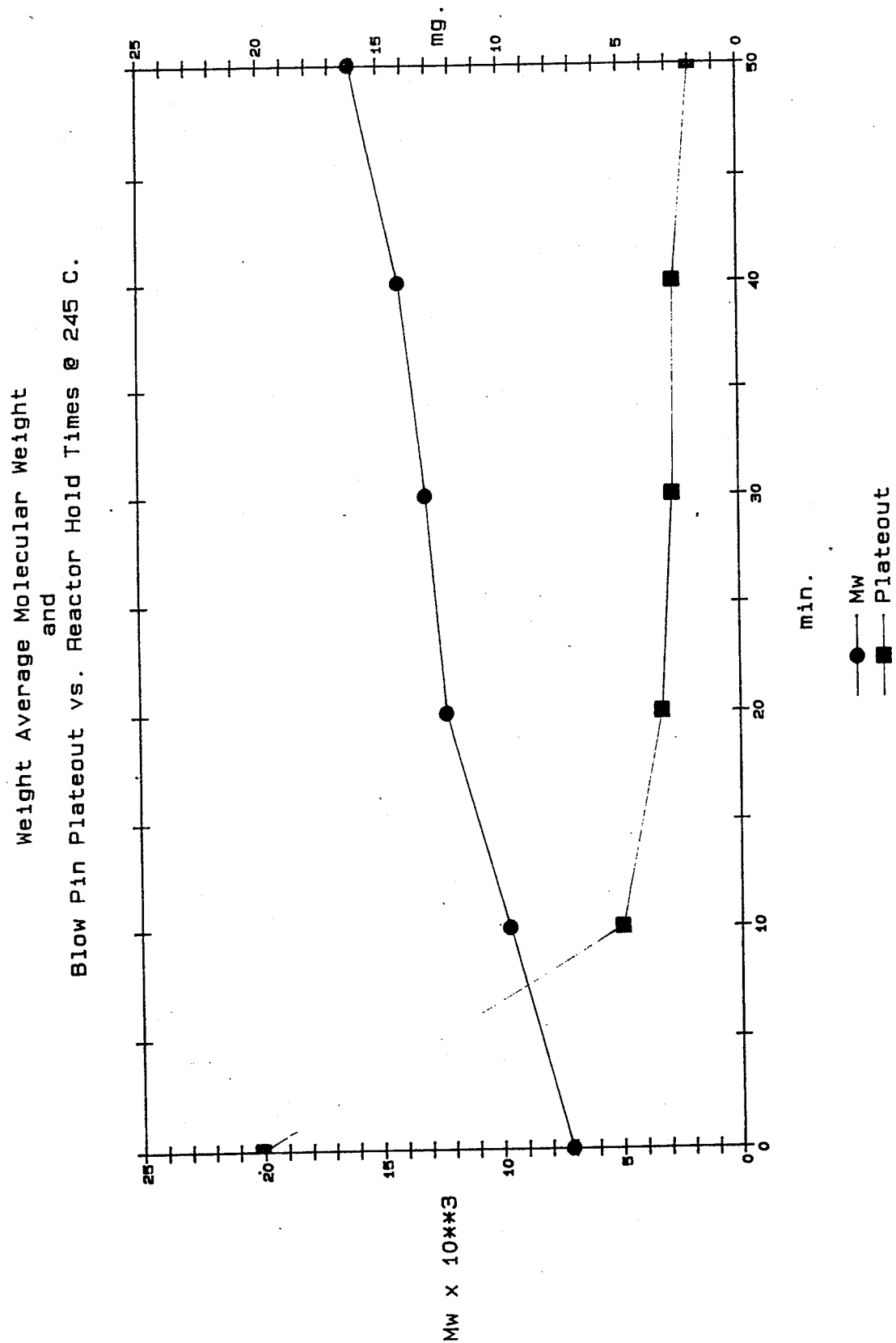

POLYAMIDE FLUORESCENT PIGMENTS

This is a continuation of application Ser. No. 409,099, filed Sept. 19, 1989 now abandoned.

BACKGROUND OF THE INVENTION AND PRIOR ART

The present invention relates to fluorescent compositions including a fluorescent dye and a resin carrier, and, more particularly, to novel fluorescent compositions including an organic fluorescent dye and polyamide resin which are useful as colorants or pigments.

U.S. Pat. Nos. 2,938,873, 3,198,741, 3,412,036, 3,812,054 and 3,922,232 disclose various fluorescent compositions made from thermoplastic resinous materials which incorporate dyes for use as coating compositions and pigments. Of particular interest herein is the use of condensation resins as carriers for fluorescent dyes to provide fluorescent pigments useful as colorants for plastics. These materials have not been found to display the heat stability and other properties at temperatures and conditions required by certain polymer processing firms.

U.S. Pat. No. 3,915,884, which is assigned to the assignee of this application, teaches low molecular weight modified polyamides of improved heat stability. However, even these materials have not been entirely satisfactory. For example, the use of such pigments in blow molding techniques has been characterized by plateout or the tendency to deposit organic material such as oligomeric species on mold surfaces. Heretofore, modifications of the polyamides of the '884 patent when used with specially selected additives were believed to have a lower degree of plateout in blow molding applications than other commercially available fluorescent pigment and were considered to set the standard in the industry.

In addition to heat stability and resistance to plateout, fluorescent pigments should be friable or grindable so that they may be reduced to relatively small particles for incorporation into plastics and other materials to be colored. For example, typical pigment particle size ranges were from 10 to 50 microns. As indicated by the patentee in the '884 patent, the ability to provide particles of small size was previously thought to be hindered by increasing molecular weight of the resin carrier. Presumably, it is for this reason that the '884 resin carriers are of relatively low molecular weight, e.g. less than 2,500.

The fluorescent dyes may be dissolved in the carrier resin to provide the pigment. Typical dye concentrations range up to about 15% based on the weight of the pigment.

For plastics processing, a masterbatch comprising pellets of a suitable plastic containing a relatively high concentration of pigment may be prepared by melt blending to provide a color concentrate for combination with the feed stock of plastics materials. The concentration of fluorescent composition or pigment in such prior art pellets has been limited usually to about 25 to 30% by weight due to the difficulty of forming uniform pellets which are free of fibrils at higher concentrations. The occurrence of fibrillation is believed to be associated with difficulties in solvating or dispersing the pigment at higher concentrations. It is desirable that relatively higher concentrations be achieved since this enables more efficient coloration.

SUMMARY OF THE INVENTION

In accordance with the invention, a thermoplastic polyamide resin which is a condensation product of a diamine and a diacid may be used as a carrier for fluorescent dyes to provide fluorescent compositions useful as pigments. Such fluorescent compositions have been found to provide pigments of adequate heat stability, improved resistance to plateout and which permit relatively high pigment concentrations to be achieved in the masterbatch.

The diamines used to produce the polyamide resin are of the general formula:

$$H_2N-R-NH_2$$

wherein R is a straight or branched chain alkylene group of from 2 to 20 carbon atoms, or a cycloalkylene group of from 5 to 6 carbon atoms optionally having up to three ring substitutions which may be the same or different selected from the group consisting of $C_1$-$C_5$ alkyl. Representative diamines include ethylenediamine, isophorone diamine, hexamethylenediamine, 1,12-dodecanediamine, 2-methylpentamethylenediamine, 2-ethyltetramethylenediamine, 1,2-diaminocyclohexane, 1,3-diaminocyclohexane, cis 1,4-diaminocyclohexane, and trans 1,4-diaminocyclohexane.

The diacid component used to produce the polyamide resins of the present invention comprises at least one dicarboxylic acid or its ester or anhydride derivative of the general formula:

$$R'(COOH)_2$$

wherein R' is a straight or branched chain alkylene group of from 3 to 20 carbon atoms, a cycloalkylene group of from 5 to 6 carbon atoms optionally having up to three ring substitutions which may be the same or different selected from the group consisting of $C_1$-$C_5$ alkyl, or a monocyclic or bicyclic arylene group of from 6 to 10 carbon atoms optionally having up to six ring substitutions which may be the same or different selected from the group consisting of $C_1$-$C_5$ alkyl or a $C_1$-$C_2$ dialkyl ester or an anhydride of the diacid formed by said monocyclic or bicyclic arylene group.

Representative dicarboxylic acids or ester or anhydride derivatives include phthalic acid/phthalic anhydride, isophthalic acid, terephthalic acid, 2,6-naphthalene dicarboxylic acid, succinic acid/succinic anhydride, glutaric acid, adipic acid, azelaic acid, sebacic acid, undecanedioic acid, dodecanedioic acid, mixtures of succinic, glutaric and adipic acids, cyclohexane dicarboxylic acid, dimethyl isophthalate, dimethyl phthalate, dimethyl terephthalate, dimethyl 2,6-naphthalene dicarboxylate, diethyl oxalate, dimethyl adipate, dimethyl glutarate and dimethyl succinate.

Preferred polyamides are prepared from the branched aliphatic diamines having 4 to 16 carbon atoms and phthalic acid, isophthalic acid, terephthalic acid or adipic acid.

In the preparation of polyamide resins in accordance with the invention, a stoichiometric excess of the diacid component is used in the condensation reaction. The resins are prepared by reacting about 0.5 to about 1.5 moles of diacid per mole of diamine, and; more preferably, 1.0 to 1.25 moles of diacid per mole of diamine. The polyamide resins are substantially linear and have a weight-average molecular weight in the range of from about 3,000 to about 50,000, and, more preferably, from about 4,000 to about 15,000. Reaction terminators are not required. Molecular weight may be controlled by regulation of the reaction time.

The fluorescent dyes employed in the compositions include fluorescent organics which are brilliantly fluorescent when in solution in vehicles such as resins and gums. These daylight fluorescent-type dyes are well known in the art and belong to the dye families known as rhodamines, fluoresceins, coumarins, naphthalimides, benzoxanthenes and acridines. Typical dyes include Basic Red 1, Basic Violet 10, Basic Violet 11, Basic Violet 16, Basic Yellow 40, Solvent Yellow 44, Solvent Yellow 131 and Solvent Yellow 135. The fluorescent dyes comprise from about 0.5 to about 15% of the total weight of the pigment.

The pigment is formed by incorporating the fluorescent dye in the condensation resin during its formation and thereafter grinding the cooled resin to the proper particle size. The resin has been found to be friable and easily ground to the typical particle size of from about 10 to about 50 microns, the typical median particle size being 20 microns. This grinding is done in a conventional manner.

In addition to the foregoing components, the fluorescent compositions of the present invention may be modified by inclusion of other ingredients which may react with the diamine and diacid components. Typically, modifiers are included to increase the molecular weight by chain extension, alter the softening or melting point, provide enhanced compatibility for particular plastics to be colored, provide functional groups of special affinity for particular fluorescent dyes, impart thermal stability to fluorescent dyes or otherwise complement or enhance the suitability of the resin carrier composition for a particular application. Preferred modifiers include bi- and monofunctional acids, monofunctional amines, monofunctional alcohols, epoxies, glycols, metal oxides, metal carbonates and metal acetates. Examples of such modifiers include the following compounds.

Illustrative bifunctional acids include p-aminobenzoic acid, p-hydroxybenzoic acid, 2-chloro-4-hydroxybenzoic acid and salicyclic acid.

Illustrative monofunctional acids include p-tert-butylbenzoic acid, stearic acid, lauric acid, pelargonic acid, palmitic acid, and cyclohexanecarboxylic acid.

Illustrative monofunctional amines include n-nonylamine, isononylamine, stearylamine, cyclohexylamine and benzylamine.

Illustrative monofunctional alcohols include stearyl alcohol, cetyl alcohol, n-nonyl alcohol, benzyl alcohol, monofunctional aliphatic alcohols having a weight-average molecular weight in the range of from 400 to 700, n-decyl alcohol, tridecyl alcohol, cyclohexanol, 2-ethylhexanol and cyclododecanol.

Illustrative epoxies include bisphenol A epoxies and aliphatic epoxies.

Illustrative glycols include cyclohexane dimethanol and ethylene glycol.

Illustrative metal oxides, metal carbonates and metal acetates include zinc oxide, zinc carbonate, antimony triacetate, antimony pentoxide, antimony trioxide, calcium oxide, calcium carbonate, calcium hydroxide, magnesium oxide and magnesium carbonate.

The amount of modifier used should not adversely affect the basic novel properties of the fluorescent compositions. Usually, the amount of the reactive modifier will range from about 1 to about 10% based on the total weight of the composition.

Conventional additives such as opacifiers, antioxidants and processing acids may also be added to the fluorescent pigments. These materials may be added prior to, during, or after the condensation reaction is completed.

The fluorescent compositions or pigments of the present invention provide improved plateout characteristics as compared with the modification of the polyamides of the '884 patent, supra. These improvements have been observed in subsequent molding techniques including blow molding and injection molding. Further, the fluorescent compositions have good friability characteristics and may be readily ground to desired pigment particle sizes. It has also been found that pellets containing increased amounts of fluorescent composition or pigment may be prepared for use in plastics processing. In accordance with the invention, pellets containing more than 30% and up to 50% pigment by weight have been prepared. This reduces the amount of carrier resin and more efficiently colors the plastic.

DETAILED DESCRIPTION OF THE INVENTION

The compositions of the present invention are prepared by condensation polymerization reactions illustrated by the following examples. In the examples and throughout the specification all parts and percentages are by weight unless otherwise indicated.

EXAMPLE 1

A reaction vessel equipped with an agitator and oil heating means was preheated by circulation of 160° C. heating oil. The preheated reactor was then charged with 1,243 parts of 2-methylpentamethylenediamine and 7 parts of zinc oxide. To the blended and heated components, 1,355 parts of isophthalic acid was added with further heating by increasing the heating oil temperature to about 270° C. Thereafter, the heating oil temperature is controlled to provide a batch temperature of about 240° C. for sixty minutes. 200 parts of stearyl alcohol was then added and a batch temperature of 240° C. was maintained for 15 additional minutes. A strong red pigment is produced by adding a combination of dyes, namely, Solvent Yellow 135, Basic Violet 11:1 and Basic Red 1. A total of 176 parts of dye were added.

EXAMPLE 2

A reaction vessel equipped as in Example 1 was charged with 1,042 parts of 1-amino-3-aminomethyl-3,5,5-trimethyl cyclohexane, commonly known as isophorone diamine, and 200 parts water. To the blended and heated components 574 parts of azelaic acid and 607 parts of isophthalic acid were added with further heating by increasing the oil temperature to 300° C. Thereafter, the oil temperature was controlled to provide a batch temperature of about 245° C. A strong red pigment is provided by adding a combination of dyes, namely, Solvent Yellow 160, Basic Violet 11:1 and Basic Red 1. A total of 252 parts of dye were added.

The diamine and diacid components as well as any reactive modifiers continue to react and increase the molecular weight of the resulting fluorescent pigment as the batch is held at an elevated temperature, e.g. 245° C. in Example 2. For evaluation of molecular weight variation, pigment samples were withdrawn at about 10 minute intervals. The weight-average molecular weights of the samples were measured using conventional gel permeation chromatography techniques. The drawing shows a graph having the "hold time" at 245° C. plotted along the abscissa and the molecular weight plotted along the ordinate. As indicated, the molecular weight increased from an initial value of about 7,000 to about 18,000 after 50 minutes. The rate of increase in molecular weight is proportional to the batch temperature. It should also be appreciated that pigments having satisfactory colorant characteristics and molecular weights as low as 3,000 may be provided in accordance with the invention by preselection of the diamine, diacid and modifier components and the use of reaction procedures of shorter duration and/or lower temperature.

In the following Table I, additional illustrative examples showing the use of various diamines, diacids, modifiers and fluorescent dyes are reported. Each of the examples was prepared in accordance with Example I.

TABLE I

| Ex. No. | Diamine Type | Parts | Diacid Type | Parts | Modifier Type | Parts | Dye Type | Total Parts |
|---|---|---|---|---|---|---|---|---|
| 3 | HMDA | 166 | IPA | 91 | | | SY 131 | 9 |
|   |      |     | AZA | 103 | | | | |
| 4 | 1,2DCH | 124 | IPA | 148 | SA | 65 | SY 135 | 6 |
|   |        |     |     |     |    |    | BV 11:1 | |
|   |        |     |     |     |    |    | BR 1 | |
| 5 | 1,4DCH | 23. | IPA | 200 | | | SY 160 | 4 |
|   | 2,MPD  | 93  |     |     | | | | |
| 6 | 2,MPD | 116 | IPA | 159 | | | SY 135 | 4 |
|   |       |     | PHT | 36  | | | | |
| 7 | 2,MPD | 166 | IPA | 166 | ZnO | 10 | BV 11:1 | 3 |
|   |       |     | ADA | 34  |     |    | BR 1 | |
| 8 | 2,MPD | 161 | IPA | 174 | ZnO | 1 | SY 135 | 8.3 |
|   |       |     | AZA | 65  |     |   | BV 11:1 | |
|   |       |     |     |     |     |   | BR 1 | |
| 9 | 2,MPD | 116 | IPA | 125 | ZnO | 1 | SY 135 | 7 |
|   |       |     | DDA | 58  |     |   | | |
| 10 | 2,MPD | 125 | IPA | 83 | SA | 11 | AY 239 | 11 |
|    |       |     | DAGS | 66 | BA | 13 | | |
| 11 | 2,MPD | 116 | DMT | 195 | U550 | 2 | SY 135 | 4 |
| 12 | 2,MPD | 138 | IPA | 177 | ZnO | 1 | SY 160 | 21 |
|    |       |     |     |     | U550 | 4 | BV 16 | |
|    |       |     |     |     | PABA | 15 | BR 1 | |
| 13 | 2,MPD | 116 | IPA | 149 | PHBA | 28 | SY 135 | 3 |
| 14 | 2,MPD | 116 | IPA | 200 | BAM | 22 | SY 135 | 1.9 |
|    |       |     |     |     |     |    | BV 11:1 | |
|    |       |     |     |     |     |    | BR 1 | |
| 15 | 2,MPD | 128 | IPA | 193 | ZnO | 1 | BV 16 | 17 |
|    |       |     |     |     | U425 | 5 | BR 1 | |
| 16 | 2,MPD | 116 | IPA | 166 | CHDM | 80 | SY 135 | 8 |
|    |       |     |     |     | BA | 24 | BV 11:1 | |
|    |       |     |     |     | 1,4ET | 11 | BR 1 | 2 |
| 17 | 2,MPD | 104 | IPA | 175 | CHDM | 16 | SY 135 | 3 |
| 18 | 2,MPD | 211 | IPA | 423 | PE | 34 | SY 160 | 13 |
|    |       |     |     |     | CHA | 76 | BV 11 | |
|    |       |     |     |     | ZCO | 25 | BR 1 | |
|    |       |     |     |     | HPO | 1 | | |
| 19 | 2,MPD | 166 | IPA | 175 | U550 | 4 | SY 135 | 18 |
|    |       |     |     |     | AT | 2 | BV 11:1 | |
|    |       |     |     |     |    |   | BR 1 | |
| 20 | 2,MPD | 127 | IPA | 164 | SUA | 22 | SY 135 | 7 |
|    |       |     |     |     |     |    | BV 11:1 | |
|    |       |     |     |     |     |    | BR 1 | |
| 21 | 2,MPD | 104 | IPA | 172 | PE | 12 | SY 135 | 7 |
|    |       |     |     |     | PHT | 24 | BV 11:1 | |
|    |       |     |     |     |     |    | BR 1 | |
| 22 | 2,MPD | 95 | IPA | 170 | IA | 65 | SY 135 | 7 |
|    |       |    |     |     |    |    | BV 11:1 | |

TABLE I-continued

| Ex. | Diamine | | Diacid | | Modifier | | Dye | Total |
|---|---|---|---|---|---|---|---|---|
| No. | Type | Parts | Type | Parts | Type | Parts | Type | Parts |
| | | | | | | | BR 1 | |

HMDA Hexamethylenediamine
2,MPD 2,Methylpentamethylenediamine
1,2DCH 1,2-Diaminocyclohexane
1,4DCH 1,4-Diaminocyclohexane
PHT Phthalic acid/Phthalic anhydride
IPA Isophthalic acid
SUA Succinic acid/Succinic anhydride
ADA Adipic acid
DDA Dodecanedioic acid
DAGS Mixture of succinic/glutaric/adipic (30/40/30)
DMT Dimethyl terephthalate
PABA p-Aminobenzoic acid
PHBA p-Hydroxybenzoic acid
AZA Azelaic acid
SY 135 Solvent Yellow 135
BV 11:1 Basic Violet 11:1
BA Benzoic acid
BAM Benzylamine
SA Stearic acid
CHDM Cyclohexane dimethanol
PE Pentaerythritol
HPO Phosphorous acid
AT Antimony triacetate
IA Isononylamine
U425 Monofunctional aliphatic alcohol-ave. mol. wgt. 425
U550 Monofunctional aliphatic alcohol-ave. mol. wgt. 550
ZCO Zinc carbonate
1,4ET 1,4 Butenediol diglycidol ether
CHA Cyclohexylamine
BR 1 Basic Red 1

The plateout of various molecular weight pigments made in accordance with Example 2 was evaluated using a test procedure wherein a blow molding machine is used to blow mold a fixed weight amount of a resin colored with the fluorescent pigment to be evaluated. The total weight of the plateout or organic species deposited on a blow pin insert due to the blow molding is considered to indicate the plateout characteristics of the fluorescent pigment.

A Rocheleau blow molding machine, Model SPB-2, is used in the test procedure. The blow pin is modified to include a removable stainless steel insert on which plateout is collected. The amount of plateout is determined by weighting the insert before and after the blow molding of the resin.

The fluorescent pigment to be tested is dry blended in a formulation including 20% fluorescent pigment, 6% titanium dioxide and 74% low density polyethylene having a melt index of 8.0. The blend is converted into a masterbatch or color concentrate by extrusion through a Killion 1¼ inch plastic extruder at a temperature of about 420° F. The dried extruded strands of resin have about a ⅛ inch diameter and they are chopped to a length of about 3/16 of an inch. Of course, the pellets may be of any size conventionally used in coloration during plastic processing. The pellets may be formed by any conventional technique and in any shape including hot roll processing to sheet form and subsequent comminution of the sheet to provide rectangular-shaped pellets. The fluorescent pigment is believed to be dispersed in a continuous phase of polyethylene in the pellets due to the melt blending of the pigment and the plastic.

The pelletized concentrate is letdown in a ratio of 1:10 in blow molding grade high density polyethylene having a melt index of 0.3. After cleaning, weighing and reinstalling the blow pin insert, a 20 pound test quantity of the mixture is blow molded to produce about 100 bottles of a selected bottle configuration. After the blow molding is completed, the blow pin insert is weighed to determine the amount of plateout.

Referring to the drawing, the blow pin plateout weight in milligrams is indicated on the ordinate of the graph for the pigment samples of Example 2 taken at 10 minute intervals. As shown by the data points, relatively higher amounts of plateout occur for fluorescent pigments having molecular weights less than about 9,000. The amount of plateout slightly decreases as the molecular weight increases to 18,000.

The fluorescent pigment of Example 1 was also prepared for injection molding plateout tests by letdown in a ratio of 1:20 in the same blow molding grade high density polyethylene as used for the above blow molding plateout test. A 75 ton Newbury injection molding machine, Model H4 75RS is used in this test to mold a three-step color chip of generally rectangular shape and about 2¼"×4". Beginning with a clean mold, 3,000 grams of the letdown mixture is molded into about 275 color chip samples.

After molding of the color chips is completed, the percentage area of the face mold covered by plateout is determined for each of the three steps. The intensity of the plateout as indicated by the thickness thereof is subjectively estimated for each step using a scale of 0 to 10 with zero indicating no plateout. These three area percentages are averaged to determine a single number evaluation of 0 to 10 for injection molding plateout. The results are reported in Table II below.

Comparative pigment Example A having a polyamide resin carrier was prepared in accordance with Example 23 of U.S. Pat. No. 3,915,884. The polyamide pigment had the following formulation.

| COMPONENT | PARTS |
|---|---|
| Cyclohexylamine | 239 |
| Isophorone diamine | 206 |
| Isophthalic acid | 400 |
| Zinc oxide | 77 |

-continued

| COMPONENT | PARTS |
|---|---|
| Adipic acid | 176 |
| Water | 34 |
| Solvent Yellow 131 | 49 |
| Basic Violet 11:1 | 13 |
| Basic Red 1 | 10 |

Comparative pigment A contained about 20% cyclohexylamine by weight as indicated and it had a molecular weight of less than 2,500.

Comparative pigment Example B was prepared by incorporating plateout reducing additives in the pigment of Example A. More particularly, silica and barium sulfate were each added in an amount equal to 0.6% by weight based on the resin to be molded.

The pigments of Example 1 and Comparative Examples A and B were each masterbatched, pelletized and tested for blow pin plateout and injection molding plateout as described above. The results are reported in Table II.

TABLE II

| EXAMPLE NO. | BLOW PIN PLATEOUT (mg) | INJECTION MOLDING EVALUATION NO. |
|---|---|---|
| 1 | 5.8 | 2.50 |
| A | 12.7 | 2.75 |
| B | 10.2 | 2.70 |

Increasing amounts of fluorescent pigment were used to prepare masterbatches of pelletized color concentrates of each of the fluorescent pigments of Example 1 and Comparative Examples A and B. The pelletized color concentrates of the Comparative Examples A and B were limited to about 20 to 25% fluorescent pigment due to the inability to form uniform pellets at higher concentrations. At such higher concentrations, the processing of the melt blend of the Comparative Examples was more difficult due to the tendency of the extruded strand to break. Also, the pellets of the Comparative Examples tended to have irregular surfaces or cut edges characterized by fibrils. Such irregularly shaped pellets are undesirable to the molder since they interfere with the sizing and automatic processing of the pellets. In contrast, the pigment of Example 1 may be incorporated in pellets at higher concentrations ranging from about 30 to about 50% by weight without loss of pellet uniformity or the occurrence of fibrillation. Generally, the pigments of the invention may be used in pellets at concentrations which are 120% to more than 200% higher than those of the prior art pigments represented by Comparative Examples A and B.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A fluorescent pigment composition comprising a solid state solution of fluorescent dye dissolved in a resin which is a condensation product of a diamine of the formula:

wherein R is a straight or branched chain alkylene group of from 2 to 20 carbon atoms, or a cycloalkylene group of from 5 to 6 carbon atoms optionally having up to three ring substitutions which may be the same or different, selected from the group consisting of $C_1$–$C_5$ alkyl; and a diacid of the formula:

wherein R' is a straight or branched chain alkylene group of from 3 to 20 carbon atoms, a cycloalkylene group of from 5 to 6 carbon atoms optionally having up to three ring substitutions which may be the same or different, selected from the group consisting of $C_1$–$C_5$ alkyl, or a mono-cyclic or bicyclic arylene group of from 6 to 10 carbon atoms optionally having up to six ring substitutions which may be the same or different selected from the group consisting of $C_1$–$C_5$ alkyl, or a $C_1$–$C_2$ dialkyl ester or an anhydride of said diacid, said diacid being present in an excess stoichiometric amount to form said condensation product, said resin consisting essentially of polymers having a weight-average molecular weight in the range from about 3,000 to about 50,000.

2. A pigment composition according to claim 1, wherein R is a branched chain alkylene group of from 4 to 16 carbon atoms and said diacid is selected from the group consisting of phthalic acid, isophthalic acid, terephthalic acid, adipic acid, azelaic acid and mixtures thereof.

3. A pigment composition according to claim 2, wherein said resin has a weight-average molecular weight in the range of from about 4,000 to about 15,000.

4. A pigment composition according to claim 3, wherein from about 1.5 to about 1.0 moles of diacid are present for each mole of diamine in said resin.

5. A pigment composition according to claim 4, wherein said pigment includes from about 0.5 to about 15% fluorescent dye based on the total weight of the pigment.

6. A pigment composition according to claim 5, wherein said composition is a particulate ranging in particle size from about 10 to about 50 microns.

7. A pigment composition according to claim 6, including a modifier selected from the group consisting of bifunctional acids, monofunctional acids, monofunctional amines, monofunctional alcohols, epoxies, glycols, metal oxides, metal carbonates and metal acetates, said modifier comprising from about 1 to about 10% by weight of said pigment composition.

8. A pigment composition according to claim 2, wherein said diamine is selected from the group consisting of 2-methylpentamethylenediamine and 1-amino-3-aminomethyl-3,5,5-trimethyl cyclohexane and said diacid is selected from the group consisting of phthalic acid, isophthalic acid, terephthalic acid, adipic acid, azelaic acid and mixtures thereof.

9. A masterbatch colorant for use in coloring a first plastic comprising a melt blend of a second plastic and said pigment composition according to claim 1.

10. A masterbatch colorant according to claim 9, wherein said colorant contains from about 30 to about 50% by weight of said pigment composition based on the weight of the colorant.

11. A masterbatch colorant according to claim 10, wherein said pigment composition and said second plastic comprise a homogeneous melt blend.

12. A masterbatch colorant according to claim 10, wherein said first and second plastic are the same.

13. A masterbatch colorant according to claim 12, wherein said diamine is selected from the group consisting of 2-methylpentamethylenediamine and 1-amino-3-aminomethyl-3,5,5-trimethyl cyclohexane and said diacid is selected from the group consisting of phthalic acid, isophthalic acid, terephthalic acid, adipic acid, azelaic acid and mixtures thereof.

14. A method for imparting fluorescent color properties to a plastic to be molded comprising forming a mixture of the plastic to be molded and a colorant including the pigment composition according to claim 1, heating the mixture to form a homogeneous melt of said plastic and colorant, and molding said melt.

15. A method according to claim 14, wherein said colorant is a masterbatch colorant comprising a melt blend of a portion of the plastic to be molded and said pigment composition.

16. A method according to claim 15, wherein said masterbatch colorant contains from about 30 to about 50% by weight of said pigment composition based on the weight of the colorant.

17. A method according to claim 16, wherein said pigment is dispersed in a matrix of said plastic to be molded.

18. A method according to claim 17, wherein said melt blend is provided by extruding a blend of said pigment composition and said plastic to be molded and pelletizing the extruded blend.

19. A method according to claim 14, wherein said diamine is selected from the group consisting of 2-methylpentamethylenediamine and 1-amino-3-aminomethyl-3,5,5-trimethyl cyclohexane and said diacid is selected from the group consisting of phthalic acid, isophthalic acid, terephthalic acid, adipic acid, azelaic acid and mixtures thereof.

20. A fluorescent pigment composition comprising a solid state solution of fluorescent dye dissolved in a resin which is a condensation product of a diamine of the formula:

$$H_2N-R-NH_2$$

wherein R is a straight or branched chain alkylene group of from 2 to 20 carbon atoms, or a cycloalkylene group of from 5 to 6 carbon atoms optionally having up to three ring substitutions which may be the same or different, selected from the group consisting of $C_1-C_5$ alkyl; and a diacid of the formula:

$$R'(COOH)_2$$

wherein R' is a straight or branched chain alkylene group of from 3 to 20 carbon atoms, a cycloalkylene group of from 5 to 6 carbon atoms optionally having up to three ring substitutions which may be the same or different, selected from the group consisting of $C_1-C_5$ alkyl, or a mono-cyclic or bicyclic arylene group of from 6 to 10 carbon atoms optionally having up to six ring substitutions which may be the same or different selected from the group consisting of $C_1-C_5$ alkyl, or a $C_1-C_2$ dialkyl ester or an anhydride of said diacid, said diacid being present in an excess stoichiometric amount ranging from about 1.5 to about 1.0 moles of diacid for each mole of diamine present to form said condensation product, said resin consisting essentially of polymers having a weight-average molecular weight in the range from about 3,000 to about 15,000.

21. A pigment composition according to claim 20, wherein said diamine is selected from the group consisting of 2-methylpentamethylenediamine and 1-amino-3-aminomethyl-3,5,5-trimethyl cyclohexane and said diacid is selected from the group consisting of phthalic acid, isophthalic acid, terephthalic acid, adipic acid, azelaic acid and mixtures thereof.

* * * * *